United States Patent [19]

Cooper

[11] Patent Number: 4,768,290
[45] Date of Patent: Sep. 6, 1988

[54] PORTABLE DISTANCE MEASURING DEVICE WITH PULL OUT MEASURING FILAMENT

[76] Inventor: Martin F. Cooper, 9 Hanna Avenue, Box 64, Toronto, Ontario, M6K 1W8, Canada

[21] Appl. No.: 30,117

[22] Filed: Mar. 26, 1987

[51] Int. Cl.⁴ .............................................. G01B 3/12
[52] U.S. Cl. ..................................... 33/139; 224/252; 224/269; 224/904
[58] Field of Search ............ 224/252, 269, DIG. 904; 33/137, 138, 139, 140

[56] References Cited

U.S. PATENT DOCUMENTS

| | | | |
|---|---|---|---|
| 209,658 | 11/1878 | Comly | 33/140 |
| 2,676,411 | 4/1954 | Horch | 33/140 |
| 3,804,420 | 4/1974 | Boyd | 33/138 X |
| 4,580,347 | 4/1986 | McKnight | 242/252 |
| 4,587,738 | 5/1986 | Kang | 33/139 |

Primary Examiner—William D. Martin, Jr.

[57] ABSTRACT

The present invention provides a portable distance measuring device having a housing, a thread measuring member mounted to the housing and a spool of filament in the form of a thread or a thin metal wire which is pulled out of the housing and operates the thread measuring member to provide accurately measured distances. The filament is wound for low resistance unwinding from the spool which is itself fixed against rotation to prevent spool inertia breakage of the filament.

12 Claims, 3 Drawing Sheets

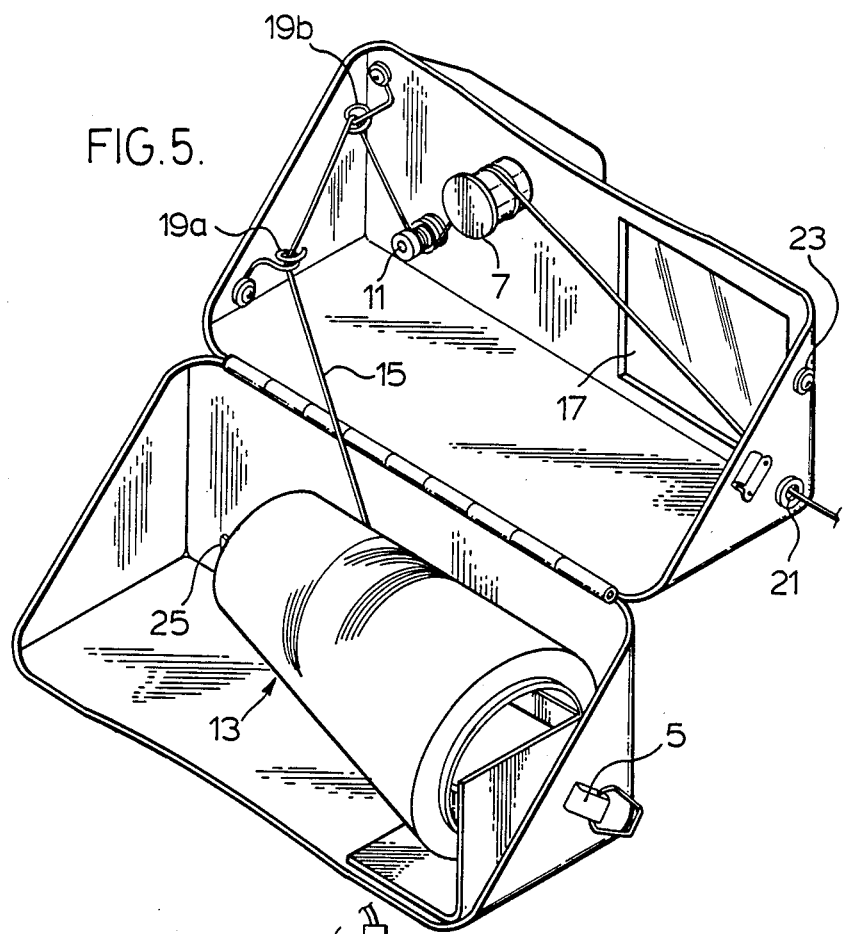
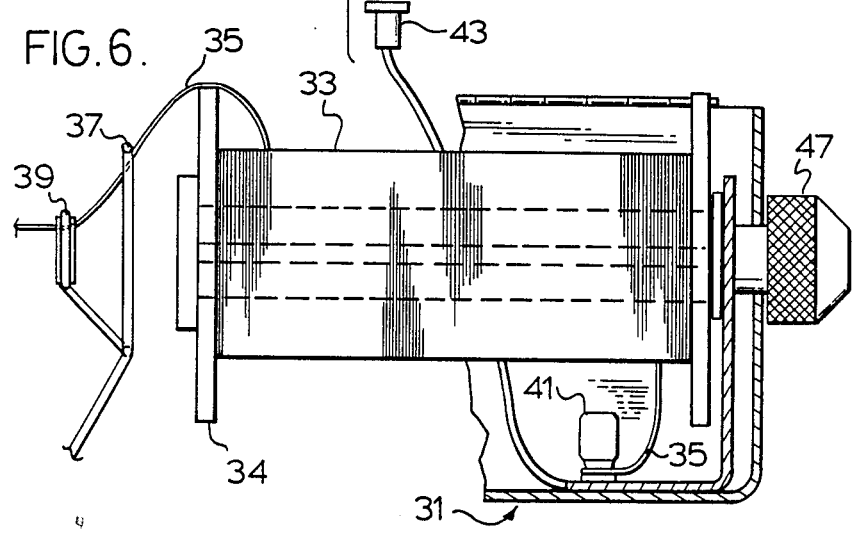

PORTABLE DISTANCE MEASURING DEVICE WITH PULL OUT MEASURING FILAMENT

FIELD OF THE INVENTION

The present invention relates to a portable distance measuring device using a thread or a thin metallic wire to operate a meter of counter for measuring different distance while carrying the device.

BACKGROUND OF THE INVENTION

The most widely used measuring device is in the form of a roll-up measuring tape. However, the measuring tape is only capable of measuring relatively short distances. It cannot be used for measuring out long distances as required in forest surveys and the like.

SUMMARY OF THE PRESENT INVENTION

The present invention provides a portable distance measuring device which is capable of measuring both short and extremely long distances. More particularly, the portable measuring device of the present invention comprises a housing, a filament in the form of a thread or thin wire to be pulled out of the housing, a measuring member for measuring the length of thread pulled out of the housing and a spool onto which the filament is wound for low resistance unwinding from the spool.

One of the principal features of the present invention is that the spool itself is fixed against rotation to prevent spool inertia breakage of the filament which enables the filament to be maintained at an extremely small diameter and allowing a very long length of the filament to be wound around the spool even in its portable form.

BRIEF DISCUSSION OF THE DRAWINGS

The above as well as other advantages and features of the present invention will be described in greater detail according to the preferred embodiments of the present invention in which;

FIG. 5 is a persepctive view showing the device of FIG. 3 in the open position.

FIG. 6 is a plan view of an alternate spool arrangement according to a further preferred embodiment of the present inevetion.

DETAILED DESCRIPTION ACCORDING TO THE PREFERRED EMBODIMENTS OF THE PRESENT INVENTION

Figure 1:
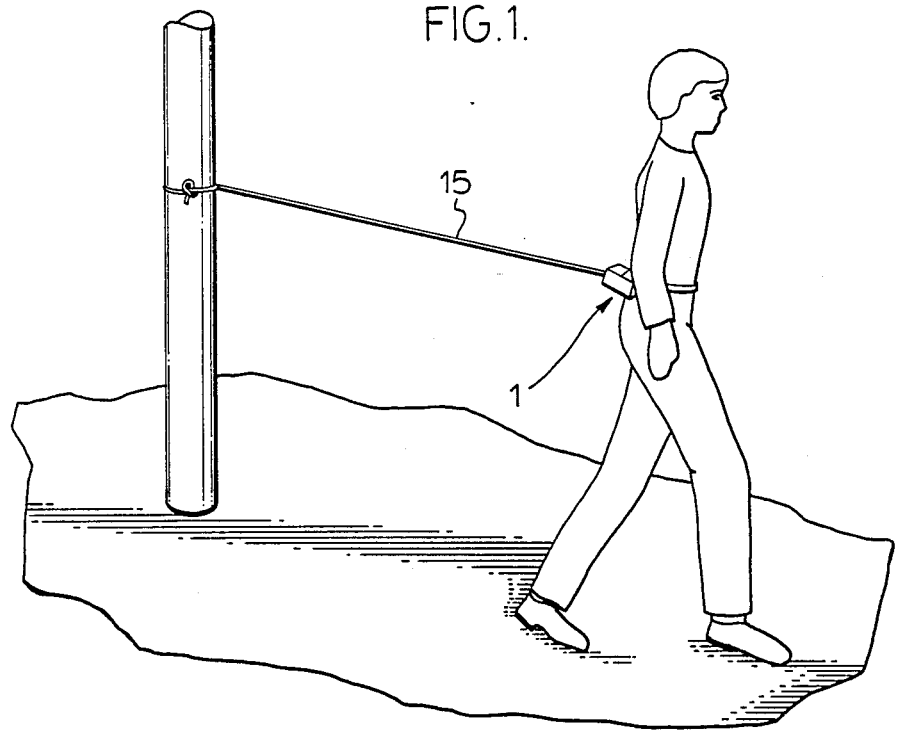
FIG. 1 is a plan view showing general operation of a portable distance measuring device according to a preferred embodiment of the present invention.

FIG. 1 shows an individual carrying a portable distance measuring device, generally indicated at 1 from which a filament 15 is being pulled for distance measuring. Typically device 1 is used for measuring relatively long distances and is particularly useful in awkward travelling areas such as forest regions and the like.

Figure 2:
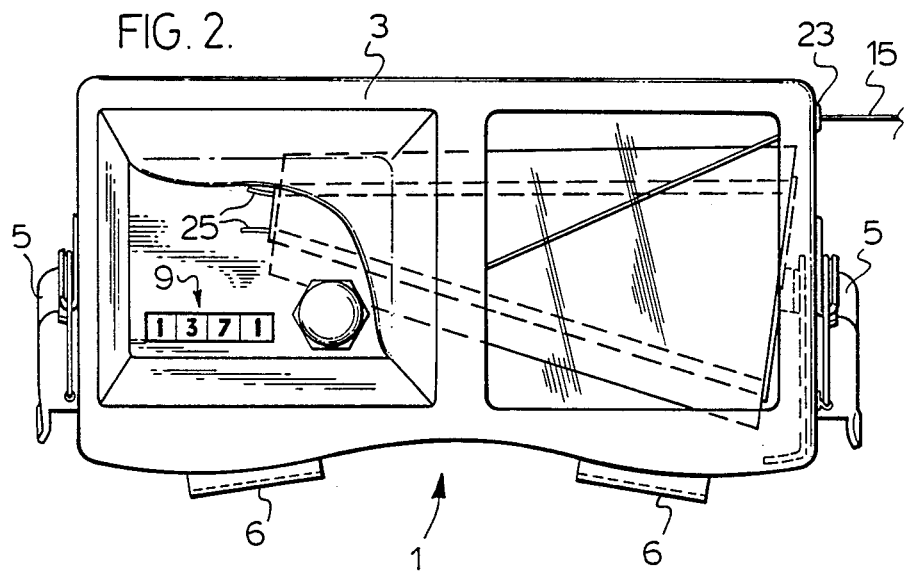
FIG. 2 is a top plan view of the device used in FIG. 1.

The general concept of the measuring method is to tie the free end of filament 15 to a stationary support and then to carry the device away from that point while providing a continuous measure and display of the distance travelled. In the arrangement shown in FIG. 1 and as can be seen in FIG. 2 the device is provided with a pair of clips 6 for mounting it to the user's belt while leaving his hands free for other purposes.

Referring in more detail to FIGS. 1 through 5 measuring device 1 includes an external housing 3 which is preferably made from a lightweight impact resistant plastic material. The housing has two mutually hinged sections which are openable and closable relative to one another. A pair of end clips 5 keep the housing closed.

Provided within housing 3 is a filament spool 13. In the embodiment shown in FIGS. 1 through 5 this spool has a frusto-conical configuration and the filament 15 wound on the spool is a textile fibre and in particular cotton thread. The spool itself is held within the housing by means of a pair of spring clips 25 which fix the spool against rotation so that there is no spool rotation inertia force applied to the extremely lightweight thread 15. Furthermore, because of the frusto-conical configuration of the spool there is very little resistance to unwinding of the thread thereby minimizing the likelihood of thread breakage allowing an extremely long length of lightweight thread to be wound onto the spool.

Figure 3:
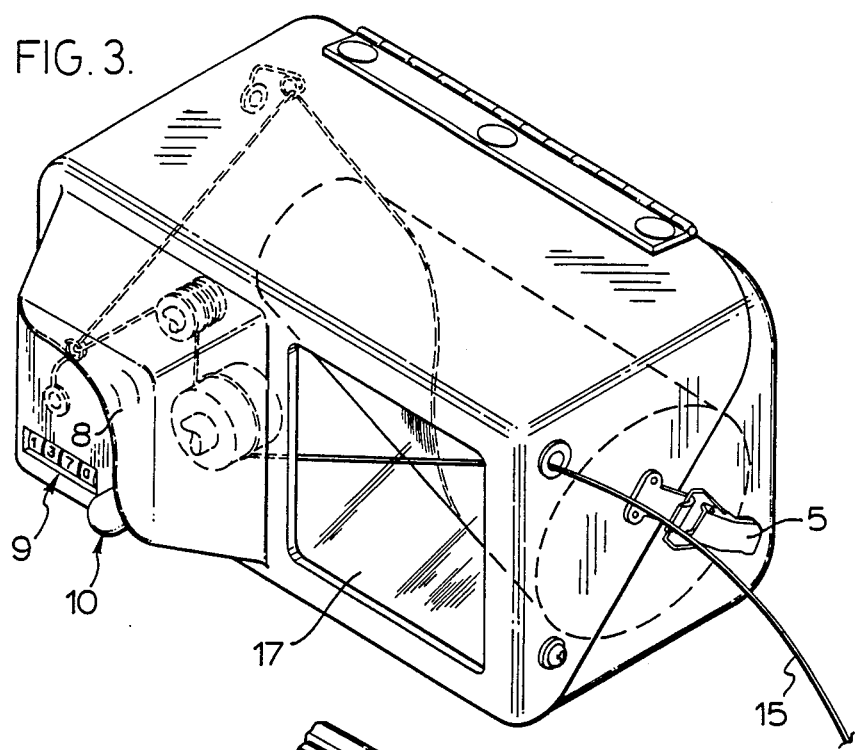
FIG. 3 is a perspective view showing, in dotted lines, the internal workings of the device of FIGS. 1 and 2.

As the thread comes off the spool it passes through a first thread guide 19a and a second thread guide 19b and finally around a rotary counter 7 before exiting the housing through an eyelet 23 having a smooth inner surface to prevent fraying of the thread. The rotary counter includes an exterior read-out 9 as seen in FIGS. 2 and 3 of the drawings which provides a continuous distance measurement as the counter is rotated by pull-out of the thread from the device.

It should be noted that the actual axle of the counter is hidden from the thread by the housing to prevent the thread from fouling the counter.

Figure 4:
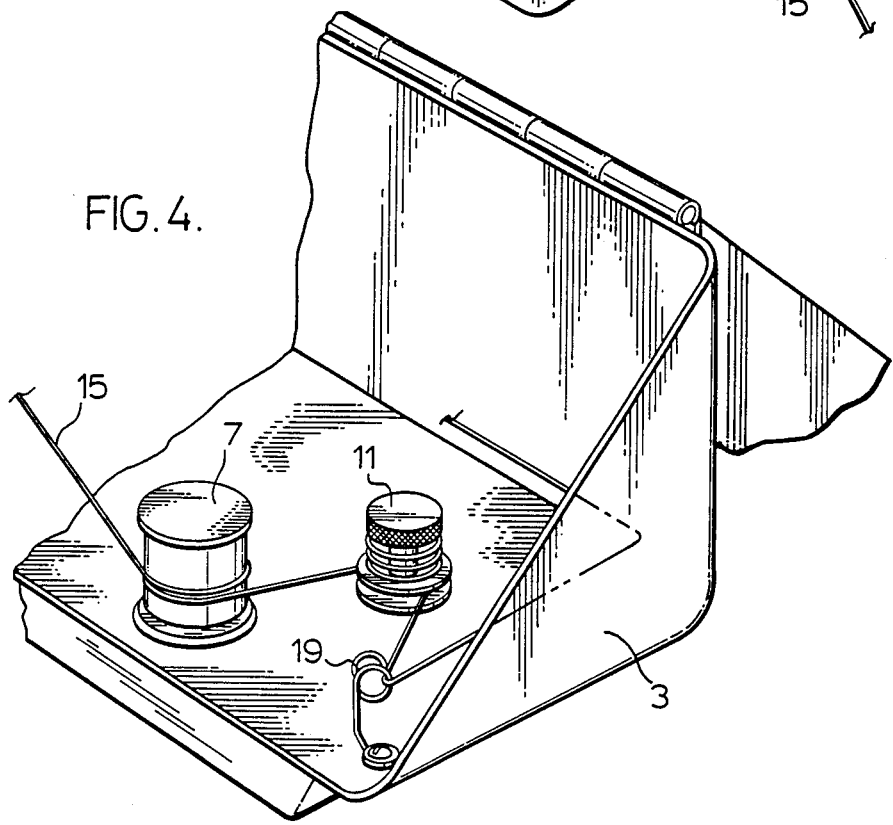
FIG. 4 is a persepctive view at the inside meter region of the device of FIGS. 1 through 3.

Located between the thread spool and the counter is a thread tensioner 11 around which the thread is wound and ensuring that the thread is always taut as it wraps around the periphery of the counter as seen in FIG. 4. As will be appreciated, cotton thread does have a certain stretchiness which could otherwise affect the accuracy of the distance readout. However, by pretightening the cotton thread prior to wrapping it around the counter such inaccuracies are essentially eliminated.

Because of the lightweight and portable nature of the measuring device, it is extremely well suited for measurements in forest and/or rough terrain areas. Once the desired measurement has been taken the thread is simply broken off by wrapping it around screw head 23 on the outside of the housing and breaking or cutting the thread. The screw head also acts as a retainer to prevent the thread from returning into the housing. The measurement is then taken from the visual readout 9 and the counter is reset to the zero position using the reset button 10.

In order to prevent inadvertant resetting of the counter, the outer casing or housing of the device is provided with a raised portion 8 and the reset button is located behind and protected by this raised housing portion.

As will be appreciated, it is important to keep forested areas free of litter as much as possible and accordingly, cotton thread 15 is biodegradable, avoiding the necessity of collecting the thread after it has been used.

It is to be understood that although the thread spool carries a tremendous length of thread the device will at some point require further thread to be added. Therefore spool 13 is replaceble by simply collapsing spring clips 25, pulling the depleted spool off the spring clips and inserting a new spool of thread. In order to visually determine when the thread is running low a window 17 is provided on the top of the housing.

FIG. 6 shows a further preferred embodiment device 31 which is not only used to measure distances but is also connected electrically to a sensing device for use in measuring electrical signals given off by underground pipes and the like. In particular, it is important to detect the presence of weaknesses in the underground pipe and to accurately locate those weaknesses for repair purposes.

In the FIG. 6 measuring device, a cylindrical spool 33 is provided with a metallic and specifically copper wire 35 being wrapped around the cylindrical spool. Again consistent with the main concept of the present invention, spool 33 is fixed against rotation and is removably mounted within the device by means of a threaded securing member 47. One end of wire 35 is grounded to the device, as indicated at 41 while the other end of the wire is pulled out of the device in the same manner as described with respect to the embodiment of FIGS. 1 through 5. However, in this partiuclar embodiment, the cylindrical spool 33 is provided with an increased diameter end plate 35 over which the wire passes and then down through a pair of smaller diameter guide elements 37 and 39. After passing through guide element 39 the wire is fitted to a tensioning device and then around a rotary counter consistent with the arrangement shown in FIG. 5 of the drawings with the free end of the wire being tied to a stationary support from which the distance is taken.

A unique feature of this embodiment is that because wire 35 is made from copper which has a certain elasticity it tends to spring directly off the spool. However, the two guides and in particular guide 37 prevents inadvertant unwinding of the springy copper wire and assures that the wire properly pulls off the spool while riding around end plate 34 before passing through guide 37.

In order to couple measuring device 31 with an electrical measuring instrument such as a voltmeter or the like, electrical connection 43 is provided back to the ground connection 41 for copper wire 35. The voltmeter then senses electrical field properties emanating from, for instance, an underground pipe line and the exact location of any irregularities in the electrical field of the pipe are determined and recorded using the distance measuring features of device 31.

Once again, it will be seen how device 31 consistent with device 1 of the earlier embodiments is not subject to spool start-up inertia on the copper wire and the wire itself is subject to little of any resistance to unwinding from the stationary spool.

From both a unique and a practical standpoint, in both embodiments described above, the counter and pretensioner are fitted to the upper section of the diagonally split housing whereas the spool is located in the lower housing section. Therefore, when the housing is open for initial set-up, the thread guides, pretensioner and counter are readily accessible for threading in an exposed upwardly facing position with the upper housing section folding onto and supported by the lower housing section.

Although various preferred embodiments of the invention have been described herein in detail, it will be appreciated by those skilled in the art that variations may be made without departing from the spirit of the invention or the scope of the appended claims.

The embodiments of the invention in which an exclusive property or privilege is claimed are defined as follows:

1. A portable distance measuring device comprising an openable housing, a filament to be pulled out of said housing, a thread length measuring member operated by pull-out of said filament and a spool onto which said filament is wound for low resistance unwinding from said spool which is fixed against rotation to prevent spool inertia breakage of said filament, said measuring member comprising a rotary counter around which said filament is wound and including a filament tensioning member between said spool and said rotatable counter, said housing comprising hingedly connected upper and lower housing sections, said spool being mounted in said lower housing section and said counter and said tensioning member being mounted in said upper housing section which when said housing is opened are exposed in a readily accessible upwardly facing position.

2. A portable distance measuring device as claimed in claim 1 wherein said spool has a frusto-conical configuration and wherein said filament comprises a textile fibre.

3. A portable distance measuring device as claimed in claim 2 wherein said textile fibre is biodegradable.

4. A portable distance measuring device as claimed in claim 1 wherein said filament is electrically conductive.

5. A portable distance measuring device as claimed in claim 4 wherein said filament comprises a metallic wire and wherein said spool has a cylindrical configuration.

6. A portable distance measuring device as claimed in claim 5 wherein said spool has an end plate of a diameter increased to that of said spool and a wire guide of decreased diameter relative to said end plate for guiding unwinding of said metallic wire.

7. A portable distance measuring device as claimed in claim 4 wherein said device includes an electrical connection for connecting to an electrical field sensing device.

8. A portable measuring device as claimed in claim 1 including a window for viewing said spool.

9. A portable measuring device as claimed in claim 1, wherein said housing is diagonally split between said upper and lower housing whereby said upper section rests against and is supported by said lower section when opened.

10. A portable measuring device as claimed in claim 1, including a counter reset button mounted atop said upper housing section and protected from inadvertant resetting by a raised region on said upper housing section.

11. A portable measuring device as claimed in claim 1 wherein said rotary counter is protected from filament fouling by said housing.

12. A portable measuring device as claimed in claim 1 including belt clips for carrying said device.

* * * * *